United States Patent [19]
Saito

[11] 4,261,784
[45] Apr. 14, 1981

[54] APPARATUS FOR MANUFACTURING SINGLE-FACED CORRUGATED BOARD

[75] Inventor: Minoru Saito, Hatano, Japan

[73] Assignee: Nihon Electronic Industry Co., Ltd., Kanagawa, Japan

[21] Appl. No.: 72,337

[22] Filed: Sep. 4, 1979

[30] Foreign Application Priority Data

Sep. 4, 1978 [JP] Japan .................... 53-108268

[51] Int. Cl.³ .................... B31F 1/28; B32B 31/12
[52] U.S. Cl. .................... 156/389; 118/50; 156/462; 156/473; 156/556
[58] Field of Search .............. 428/182, 184, 186, 195; 156/205–210, 462, 470–473, 547, 548, 550, 556, 389; 118/50

[56] References Cited
U.S. PATENT DOCUMENTS

| | | | |
|---|---|---|---|
| 2,018,240 | 10/1935 | Swift, Jr. | 156/473 |
| 2,429,482 | 10/1947 | Munters | 156/208 |
| 2,589,966 | 3/1952 | Rullo | 156/472 |
| 3,077,222 | 2/1963 | Shanley | 156/473 |

*Primary Examiner*—Paul J. Thibodeau
*Attorney, Agent, or Firm*—Fleit & Jacobson

[57] ABSTRACT

An apparatus for manufacturing single-faced corrugated board by corrugating a core board, applying a paste to the corrugated core board and then facing the corrugated core board with a liner board on one side thereof, comprises an airtight chamber arranged on the back side of a top roll, a bottom roll and a press roll so as to enclose a pasting unit, air supply means for supplying air into the airtight chamber and exhaust grooves formed in the peripheral surface of the bottom roll, whereby a high pressure is established within the airtight chamber to thereby closely press the corrugated core board against the bottom roll.

5 Claims, 4 Drawing Figures

APPARATUS FOR MANUFACTURING SINGLE-FACED CORRUGATED BOARD

BACKGROUND OF THE INVENTION

This invention relates to apparatus for manufacturing single-faced corrugated board.

In the past, it has been the usual practice to produce single-faced corrugated board by passing a core board between a pair of corrugated rolls arranged one above another to rotate in the opposite directions to corrugate the core board, applying a paste to the tops of the corrugations in the core board by a pasting roll while holding the core board in close contact with the bottom roll by guide fingers arranged along the lower half of the bottom roll and facing the pasted core board with a liner board fed by way of a separate press roll rotated in the opposite direction to the bottom roll while passing them between the bottom roll and the press roll. In this case, the guide fingers guide the core board along the bottom roll while preventing the core board from slipping off the bottom roll due to the resilience of the core board and the centrifugal force caused by the rotation of the bottom roll.

However, prior art single-faced corrugated board manufacturing apparatus of the type employing guide fingers to closely press a core board against the bottom roll, have the following disadvantages.

1. Due to the need to arrange both of the guide fingers and the pasting roll opposite to the lower half peripheral surface of the bottom roll, it is impossible to apply the paste to the portions of the core board corresponding to the guide fingers with the resulting deterioration of the strength of corrugated board boxes.

2. As the rotational speed increases, excepting the portions pressed by the guide fingers, the core board bulges due to the centrifugal force, thus deteriorating the application of paste and the formation of corrugations with the resulting reduction in the strength.

3. Due to the friction between the guide fingers and the core board, the corrugations get out of shape and the strength of the resulting corrugated board is decreased.

4. It is extremely difficult to arrange the guide fingers in a manner that the proper application of paste is not impeded and the core board is accurately guided along the bottom roll, and moreover not only a high degree of accuracy and skill are respectively required for the shape and mounting of the guide fingers but also considerable expenses and labor are required for the replacement of the worn fingers.

SUMMARY OF THE INVENTION

It is therefore an object of the invention to provide an apparatus for manufacturing single-faced corrugated board which is capable of stably and positively producing sheets of corrugated board having a greatly increased strength.

It is another object of the invention to provide an apparatus in which a core board is moved while the core board is positively held in close contact with the peripheral surface of a bottom roll so as to thoroughly and uniformly apply a paste to all the corrugations in the core board.

It is still another object of the invention to provide an apparatus in which an air pressure is utilized to closely press a core board against a bottom roll to thereby overcome the deficiencies of the prior art apparatus employing guide fingers.

The above and other objects, features and advantages of the invention will become more apparent from reading the following description of its preferred embodiment.

In accordance with the invention there is thus provided a corrugated board manufacturing apparatus comprising a top roll and a bottom roll for holding therebetween a core board and forming corrugations therein, a pasting unit including a pasting roll for applying a paste to the corrugated core board moving along the lower half of the bottom roll and a paste pad with a pair of dam plates for regulating the paste application width of the pasting roll and a press roll for facing the pasted core board with a liner board fed separately, wherein there are further provided an airtight chamber formed to enclose the pasting unit on the back side of the top and bottom rolls and the press roll, air supply means for supplying air into the airtight chamber and exhaust grooves formed in the outer peripheral surface of the bottom roll, whereby a high pressure is established within the airtight chamber so as to closely press the corrugated core board against the bottom roll. The apparatus of the invention further comprises cleaning fingers provided in front of the bottom roll to come into and out of engagement with the exhaust grooves, means for positioning the paste application width regulating dam plates of the pasting unit from outside of the airtight chamber and discharge means for discharging the paste in the paste pad to the outside of the airtight chamber without the paste being mixed with the air in the chamber.

DESCRIPTION OF THE PREFERRED EMBODIMENT

Figure 1:
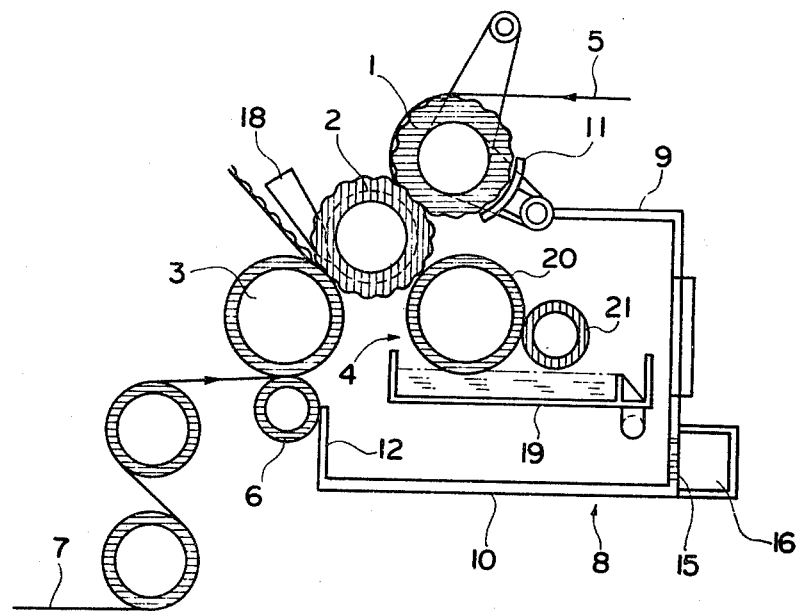
FIG. 1 is a schematic sectional view showing an embodiment of the present invention.

In FIGS. 1 to 4, numeral 1 designates a top roll, 2 a bottom roll, 3 a press roll, 4 a pasting unit, 5 a core board, 6 a seal roll arranged in close contact with the lower surface of the press roll 3, 7 a liner board, and 8 a box airtight chamber formed to enclose the pasting unit 4 on the back side of the top and bottom rolls 1 and 2, the press roll 3 and the seal roll 6 which are arranged close to one another. The airtight chamber 8 includes a top plate 9 and a bottom plate 10 having their forward edges respectively arranged in close proximity to the top roll 1 and the seal roll 6 by way of seal plates 11 and 12 and side plates 13 and 14 having their forward edges arranged practically in close proximity to the sides of the rolls so as to increase the pressure within the chamber. Numeral 15 designates an air inlet port for supplying air into the airtight chamber 8, and 16 an air pipe connected to an air blower which is not shown, whereby air is supplied into the airtight chamber 8 through the air inlet port 15 so that the inner pressure of the chamber 8 is increased and the core board 5 which was corrugated by the top and bottom rolls 1 and 2 is pressed closely against the bottom roll 2.

Figure 2:
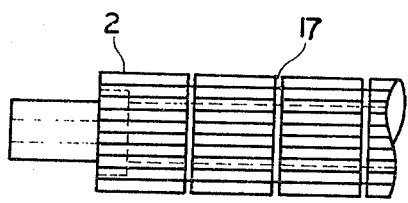
FIG. 2 is a partial plan view showing one form of the bottom roll used with the invention.

Numeral 17 designates a plurality of annular exhaust grooves formed at predetermined spaces in the outer surface of the bottom roll 2 as shown in FIG. 2, whereby the air between the corrugated core board 5 and the bottom roll 2 is allowed to escape to the front of the bottom roll 2. Numeral 18 designates cleaning fingers arranged in front of the bottom roll 2 so as to come into and out of engagement with the exhaust grooves 17 so as to prevent paper scraps, paste, oil and the like from entering and clogging the grooves during operation. Numeral 19 designates a paste pad, 20 a pasting roll and 21 a doctor roll.

Figure 3:
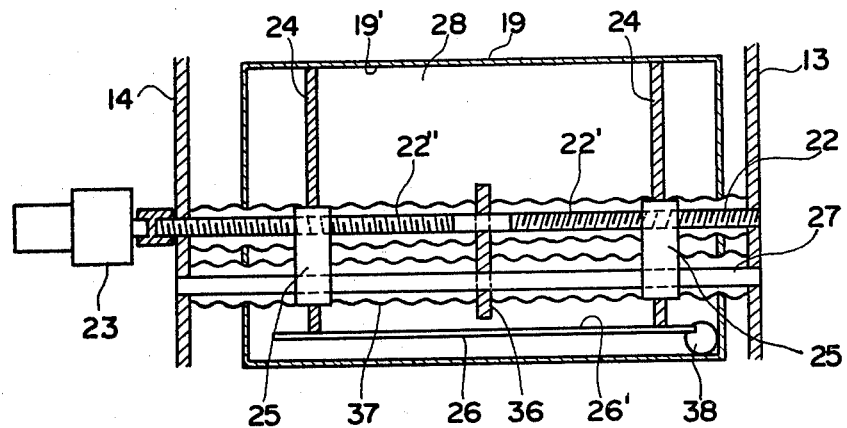
FIG. 3 is a schematic plan view showing one form of a mechanism for positioning the paste application width regulating dam plates of the pasting unit used with the invention.
Figure 4:
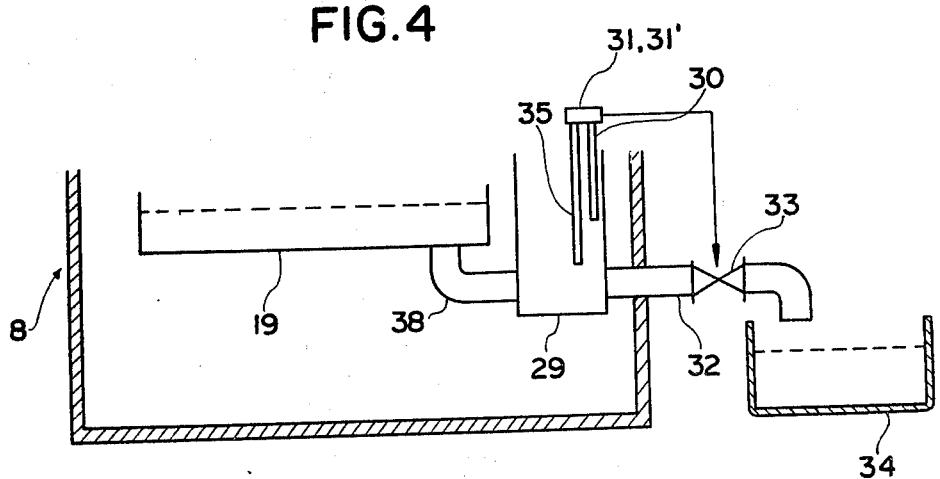
FIG. 4 is a schematic diagram of a mechanism for discharging the paste from the paste pad of the pasting unit used with the invention.

Referring now to FIGS. 3 and 4 showing an embodiment of the pasting unit used with the invention, numeral 22 designates a feed screw for adjusting the spacing between paste application width regulating dam plates, which is extended through the paste pad side walls, rotatably mounted in the side walls 13 and 14 of the airtight chamber 8 and connected at its one end to a motor 23 or any other suitable drive means provided outside the chamber 8. Formed on both sides of the central portion of the feed screw 22 are oppositely threaded portions 22' and 22" and a pair of dam plates 24 are threadedly fitted on the threaded portions 22' and 22" through guide blocks 25 and 25, whereby when the screw 22 is turned in one direction the dam plates 24 and 24 are slid along a pad inner wall 19' and an inner wall 26' of a partition plate 26 so as to decrease the spacing therebetween, whereas when the screw 22 is turned in the other direction the spacing between the dam plates 24 is increased. Numeral 27 designates a subshaft provided parallel to the feed screw 22 to support and guide the guide blocks 25 and the subshaft 27 is extended through the pad side walls and mounted in the airtight chamber side walls 13 and 14 as shown in FIG. 3. The paste is fed into a space 28 defined by the dam plate 24, the paste pad inner wall 19' and a partition inner wall 26', so that the paste is supplied onto the surface of the pasting roll 20 rotated in close contact with the upper surface of the paste filling the space between the dam plates 24 and in this way the paste can be uniformly applied to the proper places of the corrugated core board. The paste filling the space 28 overflows the partition plate 26 and it is then introduced into a subtank 29 through a discharge pipe 38. When the paste level in the subtank 29 reaches the lower end of an upper level gage 30, an upper level switch 31 is operated so that a valve 33 mounted in an external discharge pipe 32 is opened to discharge the paste into an external tank 34, whereas when the paste level in the subtank 29 drops to the lower end of a lower level gage 35 a lower level switch 31' is operated to close the valve 32. In this way, when the paste supplied into the paste pad 19 is discharged to the outside, the inner pressure of the airtight chamber 8 is positively prevented from decreasing and at the same time entry of the air into the paste is prevented.

Numeral 36 designates a supporting member supporting the dam plate spacing adjusting feed screw 22 and the subshaft 27 at their central portions, and 37 a bellows for sealing the feed screw 22 and the subshaft 27 against the paste.

It will thus be seen from the foregoing that in accordance with the invention, by virtue of the fact that the airtight chamber including the pasting unit is provided on the back side of a group of rolls including the bottom roll whereby air is fed into the airtight chamber through the air inlet port to increase the chamber inner pressure and the core board corrugated by passing it between the top and bottom rolls is pressed against the bottom roll, the core board can be moved while it is being positively held in close contact with the outer surface of the bottom roll with the result that the paste can be thoroughly and uniformly applied to all the corrugations and the strength of the resulting corrugated board can be increased greatly. In addition, by virtue of the fact that the corrugated core can be pressed from the back by an air pressure against the bottom roll all over the surface of the board, the invention can entirely eliminate the deficiencies of the prior art apparatus employing guide fingers. Further, by virtue of the fact the paste application width regulating dam plates provided on the pasting unit inside the airtight chamber can be simply positioned from outside the airtight chamber by an electric drive or other drive means, the apparatus can be easily adapted for the manufacture of many different types of corrugated board, and moreover the fact that the past can be discharged from the paste pad without any drop in the inner pressure of the airtight chamber has the effect of making easier the maintenance of the inner pressure of the airtight chamber and the controls.

We claim:

1. In a single-faced corrugated board manufacturing apparatus including a top roll and a bottom roll for holding therebetween and corrugating a core board, pasting means having a pasting roll for applying a paste to said corrugated core board maving along a lower part of said bottom roll and a paste pad with a pair of dam plates for regulating a paste application width of said pasting roll, and a press roll for facing said pasted core board with a liner board fed separately, the improvement comprising an airtight chamber formed to enclose said pasting means on the back side of said top and bottom rolls and said press roll, air supply means for feeding air into said airtight chamber, and a plurality of exhaust grooves formed in an outer surface of said bottom roll, whereby a high pressure is established within said airtight chamber so as to closely press said corrugated core board against said bottom roll.

2. An apparatus according to claim 1, wherein said airtight chamber is formed into a box shape comprising a top plate having a forward edge thereof arranged in close contact with said top roll through a seal plate, a bottom plate having a forward edge thereof arranged in close contact with said bottom roll through another seal plate, a seal roll and said press roll, and a pair of side plates having forward edges thereof arranged practically in close contact with the sides of said rolls whereby to increase the inner pressure of said airtight chamber.

3. In a single-faced corrugated board manufacturing apparatus including a top roll and a bottom roll for holding therebetween and corrugating a core board, pasting means having a pasting roll for applying a paste to said corrugated core board moving along a lower part of said bottom roll and a paste pad with a pair of dam plates for regulating a paste application width of said pasting roll, and a press roll for facing said pasted core board with a liner board fed separately, the improvement comprising an airtight chamber formed to enclose said pasting means on the back of said top and bottom rolls and said press roll, air supply means for feeding air into said airtight chamber, a plurality of exhaust grooves formed in an outer surface of said bottom roll, cleaning fingers arranged in front of said bottom roll to engage and disengage with said exhaust grooves, means for positioning said paste application width regulating dam plates from outside said airtight chamber, and discharge means for discharging the paste in said paste pad to the outside of said airtight chamber without allowing the air in said airtight chamber to mix with said paste, whereby a high pressure is established within said airtight chamber so as to closely press said corrugated core board against said bottom roll.

4. An apparatus according to claim 3, wherein said means for positioning said paste application width regulating dam plates comprises a feed screw having one end thereof connected to drive means disposed outside said airtight chamber, portions of said feed screw on both sides of the central portion thereof being threaded oppositely, and said pair of paste application width regulating dam plates each thereof being threadedly mounted on one of said oppositely threaded portions of said feed screw by way of a guide block.

5. An apparatus according to claim 3, wherein said discharge means comprises a liquid discharge pipe disposed to communicate with said paste pad and having a subtank disposed at an intermediate point thereof, and means for maintaining the paste level in said subtank within a predetermined range of levels.

* * * * *